US011544189B2

(12) United States Patent
Lin et al.

(10) Patent No.: US 11,544,189 B2
(45) Date of Patent: Jan. 3, 2023

(54) SYSTEM AND METHOD FOR MEMORY MANAGEMENT

(71) Applicant: ALIBABA GROUP HOLDING LIMITED, Grand Cayman (KY)

(72) Inventors: Jilan Lin, San Mateo, CA (US);
Shuangchen Li, San Mateo, CA (US);
Dimin Niu, San Mateo, CA (US);
Hongzhong Zheng, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/789,271

(22) Filed: Feb. 12, 2020

(65) Prior Publication Data

US 2021/0248073 A1 Aug. 12, 2021

(51) Int. Cl.
*G06F 12/06* (2006.01)
(52) U.S. Cl.
CPC .. *G06F 12/0646* (2013.01); *G06F 2212/1041* (2013.01)
(58) Field of Classification Search
CPC ............ G06F 12/0646; G06F 12/0871; G06F 16/9024; G06F 16/2282; G06F 12/0888; G06F 12/45; G06F 12/46; G06F 12/468; G06F 12/604; G06F 12/60; G06F 2212/608; G06F 2212/1041; G06F 2212/1044
See application file for complete search history.

(56) References Cited

U.S. PATENT DOCUMENTS

| 2009/0119279 | A1* | 5/2009 | Goyal | G06F 16/9024 |
| 2017/0068746 | A1* | 3/2017 | Levin | G06F 16/278 |
| 2018/0129613 | A1* | 5/2018 | Faldu | G06F 12/0891 |
| 2018/0203897 | A1* | 7/2018 | Van Rest | G06F 16/9024 |
| 2019/0179752 | A1* | 6/2019 | Yoo | G06F 12/128 |
| 2020/0019339 | A1* | 1/2020 | Yang | G06F 3/0604 |

OTHER PUBLICATIONS

Wang, X., Zhu, Y. and Y. Chen, "Quantitative Analysis of Graph Algorithms: Models and Optimizations Methods," IEEE 2nd International Conference on Big Data Security on Cloud, IEEE International Conference on High Performance and Smart Computing, IEEE International Conference on Intelligent Data and Security, 2016.*

Zhang, Y., Kiriansky, V., Mendis, C., Zaharia, M. and S. Amarasinghe, "Optimizing Cache Performance for Graph Analytics," 2016.*

(Continued)

*Primary Examiner* — Tracy A Warren
(74) *Attorney, Agent, or Firm* — Finnegan, Henderson, Farabow, Garrett & Dunner, LLP (57) ABSTRACT

Embodiments of the disclosure provide methods and systems for memory management. The method can include: receiving a request for allocating target node data to a memory space, wherein the memory space includes a buffer and an external memory and the target node data comprises property data and structural data and represents a target node of a graph having a plurality of nodes and edges; determining a node degree associated with the target node data; allocating the target node data to the memory space based on the determined node degree.

16 Claims, 8 Drawing Sheets

(56) References Cited

OTHER PUBLICATIONS

PCT International Search Report and Written Opinion dated Mar. 11, 2021 issued in corresponding International Application No. PCT/US2021/016826 (11 pgs.).

Lakhotia, et al., "ReCALL: Reordered Cache Aware Locality based Graph Processing," 2017 IEEE 24$^{th}$ International Conference on High Performance Computing (HiPC), 2017, pp. 273-282.

* cited by examiner

FIG. 1

|        | Node 0 | Node 1 | Node 2 | Node 3 | Node 4 |
|--------|--------|--------|--------|--------|--------|
| Node 0 | 0      | 1      | 0      | 0      | 0      |
| Node 1 | 1      | 0      | 1      | 0      | 1      |
| Node 2 | 0      | 1      | 0      | 1      | 1      |
| Node 3 | 0      | 0      | 1      | 0      | 1      |
| Node 4 | 0      | 1      | 1      | 1      | 0      |

| Node iD | 0 | 1 | 2 | 3 | 4 |
|---|---|---|---|---|---|
| Property 0 | 0.3 | 0.6 | 0.2 | 0.8 | 0.1 |
| Property 1 | 0.2 | 0.7 | 0.1 | 0.9 | 0.2 |
| ... | ... | ... | ... | ... | ... |
| Pointer | P0 → | P1 → | P2 → | P3 → | P4 → |

202

| | | |
|---|---|---|
| 1 | | |
| 2 | 4 | |
| 1 | 3 | 4 |
| 2 | 4 | |
| 1 | 2 | 3 |

SYSTEM AND METHOD FOR MEMORY MANAGEMENT

BACKGROUND

Graph processing can process a data set including a plurality of data entities as a graph. In the graph, each of the data entities can be stored in a form of nodes and edges. A node can represent an object, such as a person, an action, a vehicle, and the like. The relationships between multiple nodes can be represented by edges of the nodes. Thus, the data set can be analyzed by performing graph processing on nodes and edges of the nodes.

To process the graph, the graph is generally loaded into a cache of a processor (e.g., a CPU) in a full size. However, as the graph continues to grow, the size of the graph can become larger than the storage capacity of the cache.

Also, as a pointer-based data structure, the relationships between multiple nodes of a graph are described by pointers, and the reliance on pointer-chasing can impose stringent requirements over latency and bandwidth of the cache.

SUMMARY

Embodiments of the disclosure provide a method for memory management. The method can include: receiving a request for allocating target node data to a memory space, wherein the memory space includes a buffer and an external memory and the target node data comprises property data and structural data and represents a target node of a graph having a plurality of nodes and edges; determining a node degree associated with the target node data; allocating the target node data in the memory space based on the determined node degree.

Embodiments of the disclosure also provide a computing system. The system can include: an external memory storing a set of instructions; and a processor comprising a buffer and comprising circuitry configured to execute the set of instructions to cause the computing system to perform: receiving a request for allocating target node data to a memory space, wherein the memory space includes a buffer and an external memory and the target node data comprises property data and structural data and represents a target node of a graph having a plurality of nodes and edges; determining a node degree associated with the target node data; allocating the target node data in the memory space based on the determined node degree.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms or definitions incorporated by reference.

Embodiments of the present disclosure provide systems and methods for cache management in graph processing. In some embodiments, a node of a graph can be allocated to a buffer or an external memory depending on a node degree of the node. For example, a node having a node degree greater than a given threshold can be allocated to the buffer. Because nodes having higher node degrees can be accessed more frequently, systems and methods according to embodiments of the disclosure can allocate precious space of the buffer to the nodes having higher node degrees to improve the efficiency of the buffer. In some embodiments of the present disclosure, property data of a node can be allocated to the buffer, while structural data of the node can be separately allocated to the external memory. Thus, the pointer-chasing can be avoided in the buffer, and the memory space can also be better utilized.

Figure 1:
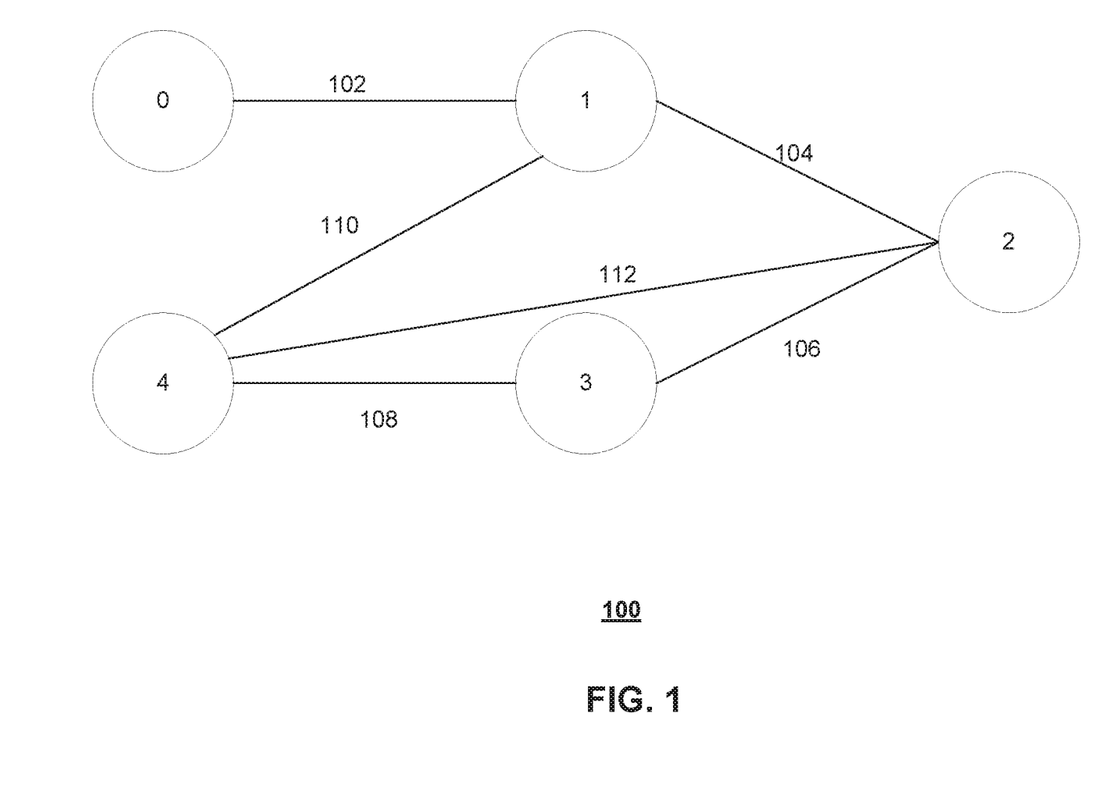
FIG. 1 illustrates a schematic diagram of an exemplary graph, according to some embodiments of the disclosure.

FIG. 1 illustrates an exemplary graph 100, according to some embodiments of the disclosure. A graph is a data structure that includes a plurality of nodes and a plurality of edges among the nodes. A node can be an object associated with property data. The property data can include a quality or trait belonging and especially peculiar to the object (an individual or a thing). For example, a node can be a person in a social network, and this person can be associated with property data, such as a user ID, a name, gender, age, and the like. As another example, a node can be a bus stop, and this bus stop can be associated with property data, such as buses that stop at the bus stop, arrival time of the buses, and the like. The node can also be associated with structural data, which describes the edges among the nodes. For example, the structural data can include a direction of an edge and a weight of the edge. As shown in FIG. 1, nodes 0-4 can be persons in a social network, and an edge between two nodes can indicate a link between two persons. For example, an edge 102 can indicate that node 0 and node 1 are friended. FIG. 1 illustrates exemplary edges 102-112.

Though graph 100 of FIG. 1 is illustrated as an undirected graph, a graph can also be a directed graph. In an example of bus stops, an edge from a first bus stop to a second bus stop can be a directed edge and a graph made of the bus stops and the edges is a directed graph. Moreover, the edge can be weighted. For example, the edge from the first bus stop to the second bus stop can be weighted to indicate a number of passengers on the edge.

Figure 2A:
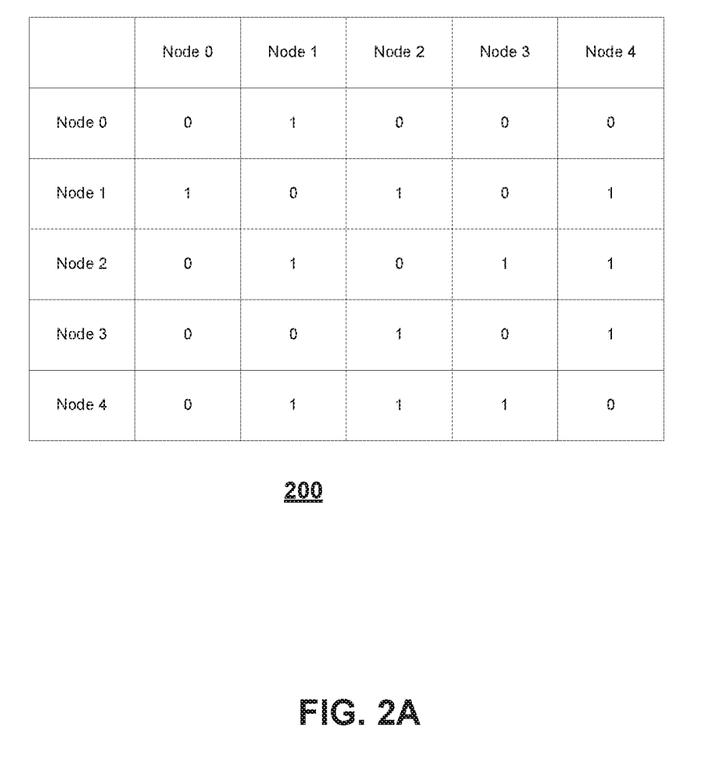
FIG. 2A illustrates an example of a graph presentation in a form of a matrix, according to some embodiments of the disclosure.

Graph 100 can be presented as a data structure, such as a matrix (e.g., a compressed sparse row (CSR) matrix), a table, a link list, and the like. FIG. 2A illustrates an example of a graph presentation in a form of a matrix 200, according to some embodiments of the disclosure.

In some embodiments, as shown in FIG. 2A, a matrix 200 can be used to present graph 100 of FIG. 1 with values of matrix elements indicting edges between two nodes. For example, node 0 has an edge connected with node 1, and therefore, values of matrix elements (1,0) and (0,1) are "1." Matrix 200 can be further compressed as a CSR matrix.

Figure 2B:
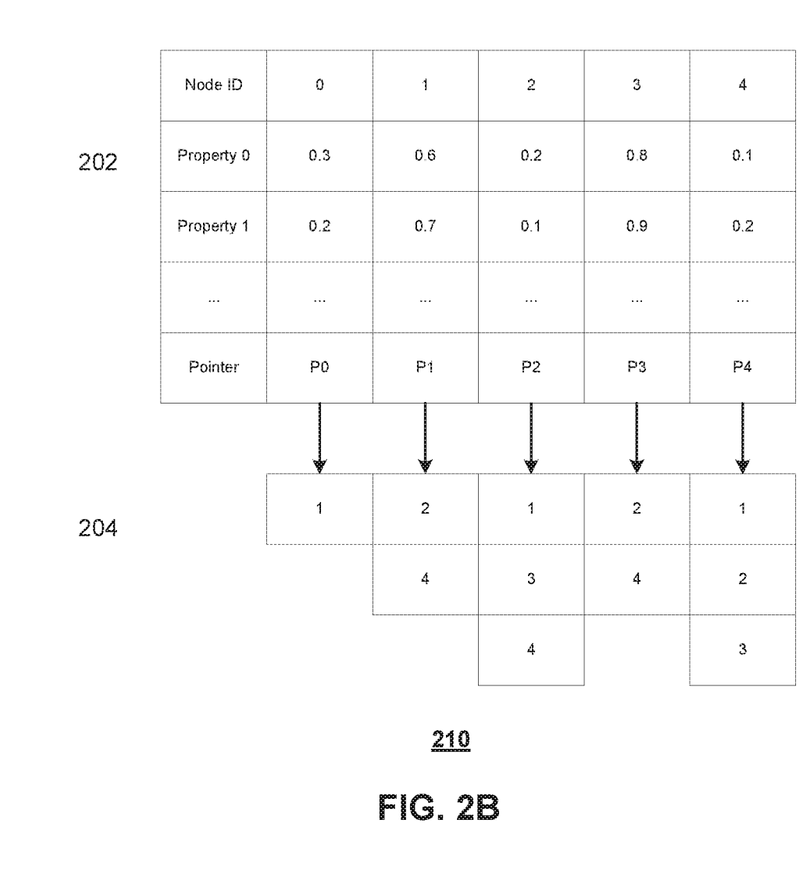
FIG. 2B illustrates a structural diagram of an exemplary graph, according to some embodiments of the disclosure.

It is appreciated that a table, a link list, and other forms can also be used to present a graph. To provide more universality, FIG. 2B illustrates a structural diagram of a graph 210, according to some embodiments of the disclosure. Graph 210 can be presented in any proper form, and FIG. 2B is merely an illustration of graph 210.

Each node in graph 210 can include property data 202 and structural data 204. In some embodiments, property data 202 can include a node ID of a node, one or more properties of the node, and a pointer to structural data 204 of the node. For example, the node ID can indicate an identification of a node (e.g., node 0, 1, 2, 3, or 4). The one or more properties can be associated with the nature of the node. As discussed above, in the example of a social network, the one or more properties can include a name, gender, age, and the like of a node, and can be presented in numerical values. The pointer in property data 202 can be used to locate structural data 204 of the node. For example, the pointer can include an address of structural data 204, which as discussed above, describes edges among the nodes. As shown in FIG. 2B, node 0 has one edge linked to node 1, node 1 has two edges linked to nodes 2 and 4, node 2 has three edges linked to nodes 1, 3, and 4, node 3 has two edges linked to nodes 2 and 4, and node 4 has tree edges linked to nodes 1, 2, and 3. A number of edges connected to a node can also be referred to as a node degree. For example, the node degree of node 0 is 1, and the node degree of node 2 is 3.

Figure 3:
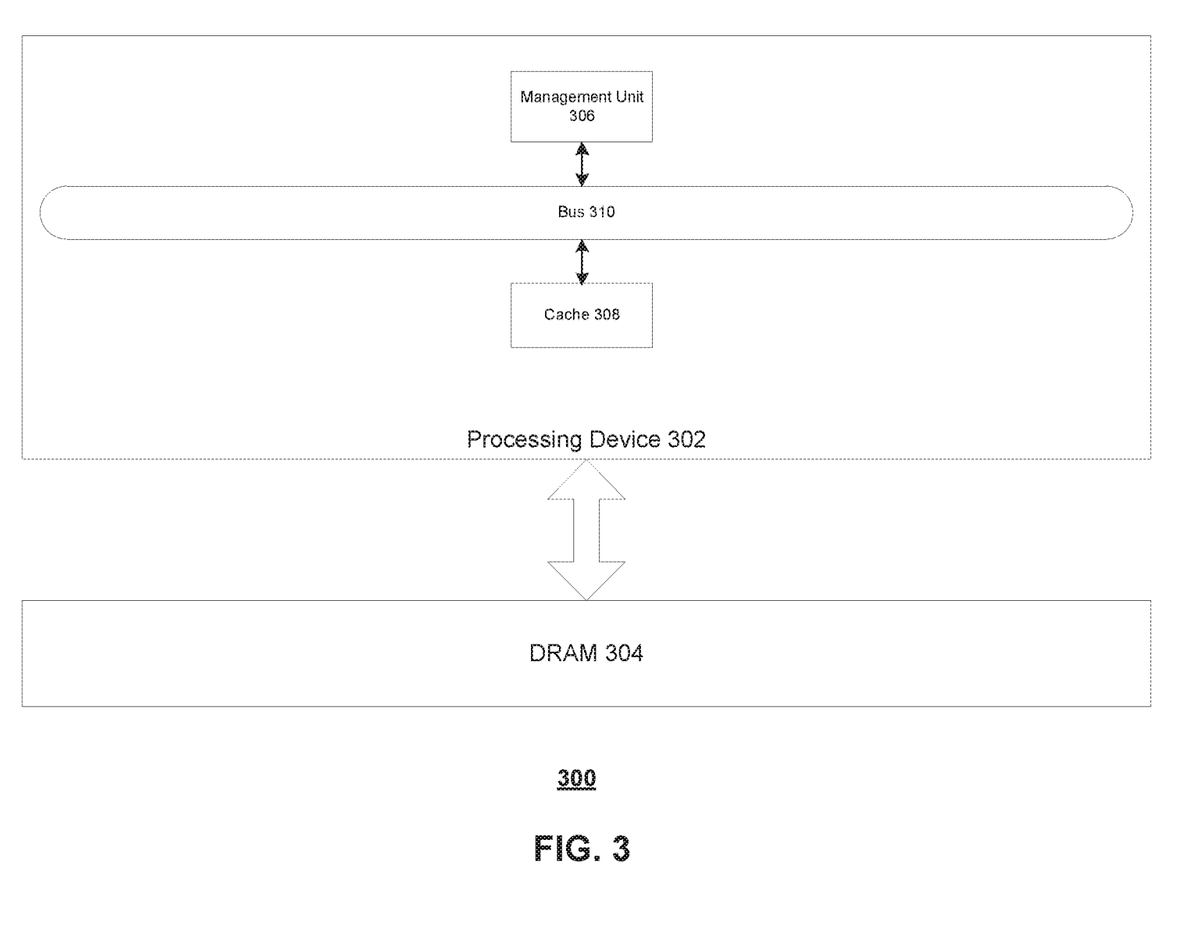
FIG. 3 illustrates a schematic diagram of an exemplary computing system, according to some embodiments of the disclosure.

FIG. 3 illustrates a schematic diagram of a computing system 300, according to some embodiments of the disclosure. Computing system 300 can include a processing device 302 and a dynamic random access memory (DRAM) 304. DRAM 304, as an off-chip memory (also known as external memory 304), can be used as a main memory to store data and to be accessed by processing device 302. Processing device 302 can be a central processing unit (CPU) or an accelerator for graph processing/neural network processing, and can include a management unit 306, a cache 308 (also known as a buffer 308), and a bus 310. When computing system 300 includes multiple processing devices, cache 308 can include the caches of the multiple processing devices. It is appreciated that processing device 302 can further include other components, such as an arithmetic logic unit (ALU), peripherals, an interface, and the like.

Figure 4:
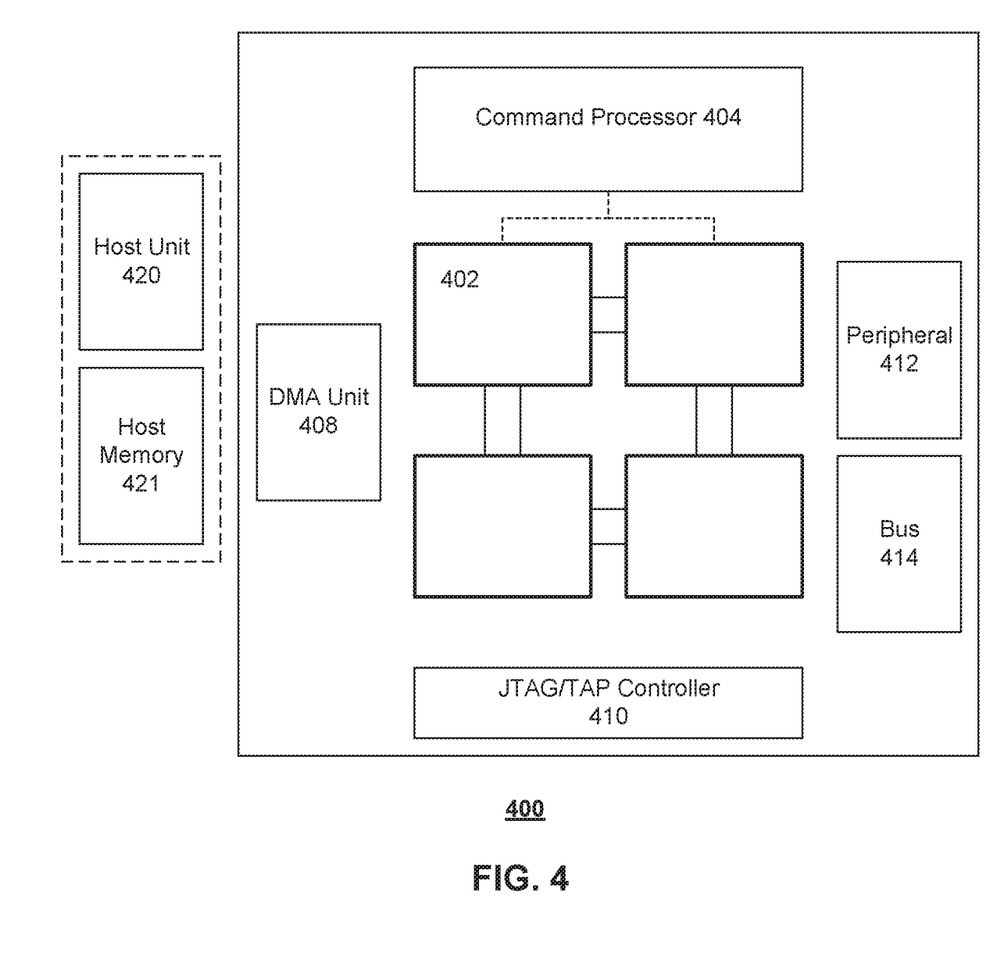
FIG. 4 illustrates an exemplary neural network accelerator architecture, according to some embodiments of the present disclosure.

In some embodiments, processing device 302 can be a neural network accelerator. FIG. 4 illustrates an exemplary neural network accelerator architecture 400, according to some embodiments of the present disclosure. In the context of this disclosure, a neural network accelerator may also be referred to as a machine learning accelerator or deep learning accelerator. In some embodiments, accelerator architecture 400 may be referred to as a neural network processing unit (NPU) architecture 400. As shown in FIG. 4, accelerator architecture 400 can include a plurality of cores 402, a command processor 404, a direct memory access (DMA) unit 408, a Joint Test Action Group (JTAG)/Test Access End (TAP) controller 410, a peripheral interface 412, a bus 414, and the like.

It is appreciated that, cores 402 can perform algorithmic operations based on communicated data. Cores 402 can include one or more processing elements that may include single instruction, multiple data (SIMD) architecture including one or more processing units configured to perform one or more operations (e.g., multiplication, addition, multiply-accumulate, etc.) based on commands received from command processor 404. To perform the operation on the communicated data packets, cores 402 can include one or more processing elements for processing information in the data packets. Each processing element may comprise any number of processing units. According to some embodiments of the present disclosure, accelerator architecture 400 may include a plurality of cores 402, e.g., four cores. In some embodiments, the plurality of cores 402 can be communicatively coupled with each other. For example, the plurality of cores 402 can be connected with a single directional ring bus, which supports efficient pipelining for large neural network models. The architecture of cores 402 will be explained in detail with respect to FIG. 4.

Command processor 404 can interact with a host unit 420 and pass pertinent commands and data to corresponding core 402. In some embodiments, command processor 404 can interact with host unit under the supervision of kernel mode driver (KMD). In some embodiments, command processor 404 can modify the pertinent commands to each core 402, so that cores 402 can work in parallel as much as possible. The modified commands can be stored in an instruction buffer. In some embodiments, command processor 404 can be configured to coordinate one or more cores 402 for parallel execution.

DMA unit 408 can assist with transferring data between host memory 421 and accelerator architecture 400. For example, DMA unit 408 can assist with loading data or instructions from host memory 421 into local memory of cores 402. DMA unit 408 can also assist with transferring data between multiple accelerators. DMA unit 408 can allow off-chip devices to access both on-chip and off-chip memory without causing a host CPU interrupt. In addition, DMA unit 408 can assist with transferring data between components of accelerator architecture 400. For example, DMA unit 408 can assist with transferring data between multiple cores 402 or within each core. Thus, DMA unit 408 can also generate memory addresses and initiate memory read or write cycles. DMA unit 408 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 400 can include a second DMA unit, which can be used to transfer data between other accelerator architectures to allow multiple accelerator architectures to communicate directly without involving the host CPU.

JTAG/TAP controller 410 can specify a dedicated debug port implementing a serial communications interface (e.g., a JTAG interface) for low-overhead access to the accelerator without requiring direct external access to the system address and data buses. JTAG/TAP controller 410 can also have on-chip test access interface (e.g., a TAP interface) that implements a protocol to access a set of test registers that present chip logic levels and device capabilities of various parts.

Peripheral interface 412 (such as a PCIe interface), if present, serves as an (and typically the) inter-chip bus, providing communication between the accelerator and other devices.

Bus 414 (such as a I²C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 414 can provide high speed communication across cores and can also connect cores 402 with other units, such as the off-chip memory or peripherals. Typically, if there is a peripheral interface 412 (e.g., the inter-chip bus), bus 414 is solely concerned with intra-chip buses, though in some implementations it could still be concerned with specialized inter-bus communications.

Accelerator architecture 200 can also communicate with a host unit 420. Host unit 420 can be one or more processing unit (e.g., an X86 central processing unit). As shown in FIG. 4, host unit 420 may be associated with host memory 421. In some embodiments, host memory 421 may be an integral memory or an external memory associated with host unit 420. In some embodiments, host memory 421 may comprise a host disk, which is an external memory configured to provide additional memory for host unit 420. Host memory 421 can be a double data rate synchronous dynamic random-access memory (e.g., DDR SDRAM) or the like. Host memory 421 can be configured to store a large amount of data with slower access speed, compared to the on-chip memory integrated within accelerator chip, acting as a higher-level cache. The data stored in host memory 421 may be transferred to accelerator architecture 200 to be used for executing neural network models.

In some embodiments, a host system (e.g., computing system 300 of FIG. 3) having host unit 420 and host memory 421 can comprise a compiler (not shown). The compiler is a program or computer software that transforms computer codes written in one programming language into instructions for accelerator architecture 400 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 400. As discussed above, these commands can be further processed by command processor 404 of accelerator architecture 400, temporarily stored in an instruction buffer of accelerator architecture 400, and distributed to corresponding one or more cores (e.g., cores 402 in FIG. 4) or processing elements. Some of the commands may instruct a DMA unit (e.g., DMA unit 408 of FIG. 4) to load instructions and data from host memory (e.g., host memory 421 of FIG. 4) into accelerator architecture 400. The loaded instructions may then be distributed to each core (e.g., core 402 of FIG. 4) assigned with the corresponding task, and the one or more cores may process these instructions.

It is appreciated that the first few instructions received by the cores 402 may instruct the cores 402 to load/store data from host memory 421 into one or more local memories of the cores (e.g., local memory 4032 of FIG. 4). Each core 402 may then initiate the instruction pipeline, which involves fetching the instruction (e.g., via a sequencer) from the instruction buffer, decoding the instruction (e.g., via a DMA unit 408 of FIG. 4), generating local memory addresses (e.g., corresponding to an operand), reading the source data, executing or loading/storing operations, and then writing back results.

According to some embodiments, accelerator architecture 400 can further include a global memory (not shown) having memory blocks (e.g., 4 blocks of 8 GB second generation of high bandwidth memory (HBM2)) to serve as main memory. In some embodiments, the global memory can store instructions and data from host memory 421 via DMA unit 408. The instructions can then be distributed to an instruction buffer of each core assigned with the corresponding task, and the core can process these instructions accordingly.

In some embodiments, accelerator architecture 400 can further include memory controller (not shown) configured to manage reading and writing of data to and from a specific memory block (e.g., HBM2) within global memory. For example, memory controller can manage read/write data coming from core of another accelerator (e.g., from DMA unit 408 or a DMA unit corresponding to the another accelerator) or from core 402 (e.g., from a local memory in core 402). It is appreciated that more than one memory controller can be provided in accelerator architecture 400. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator architecture 400 of FIG. 4 can be used for convolutional neural networks (CNNs) in some embodiments of the present disclosure, it is appreciated that accelerator architecture 400 of FIG. 4 can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like.

Referring back to FIG. 3, computing system 300 can provide a memory space with an arrange of memory addresses for accessing (e.g., writing/reading) data in computing system 300. The memory space can include DRAM 304 and cache 308. Accordingly, the arrange of memory addresses can include a first set of addresses directed to DRAM 304 and a second set of addresses directed to cache 308. Therefore, in computing system 300 according to embodiments of this disclosure, cache 308 can also store part of data, instead of a copy of data stored in DRAM 304. In other words, DRAM 304 and cache 308, as a whole, provide the memory function of computing system 300.

Management unit 306 can determine whether a memory request (e.g., a memory reading request or a memory writing request) is directed to DRAM 304 or cache 308. In some embodiments of FIG. 3, management unit 306 is illustrated as part of processing device 302. However, it is appreciated that management unit 306 can also be implemented as a software component. Details of an exemplary management unit 306 will be further described below.

Cache 308 is an on-chip memory high-speed memory used for storage of calculations, data, and other work in progress. Cache 308 can be a next closet memory to the ALU of processing device 302 after processor registers. A size of cache 308 can be relatively small, and thus, can also be referred to as a scratchpad memory. As cache 308 has corresponding memory addresses in computing system 300 and also provides the memory function, in together with DRAM 304, to computing system 300, cache 308 generally does not contain a copy of data that is stored in DRAM 304.

Bus 310 can connect all internal components to one another as called for by processing device 302. While not all components are connected to every other component, all components do have some connection to other components they need to communicate with.

Figure 5A:
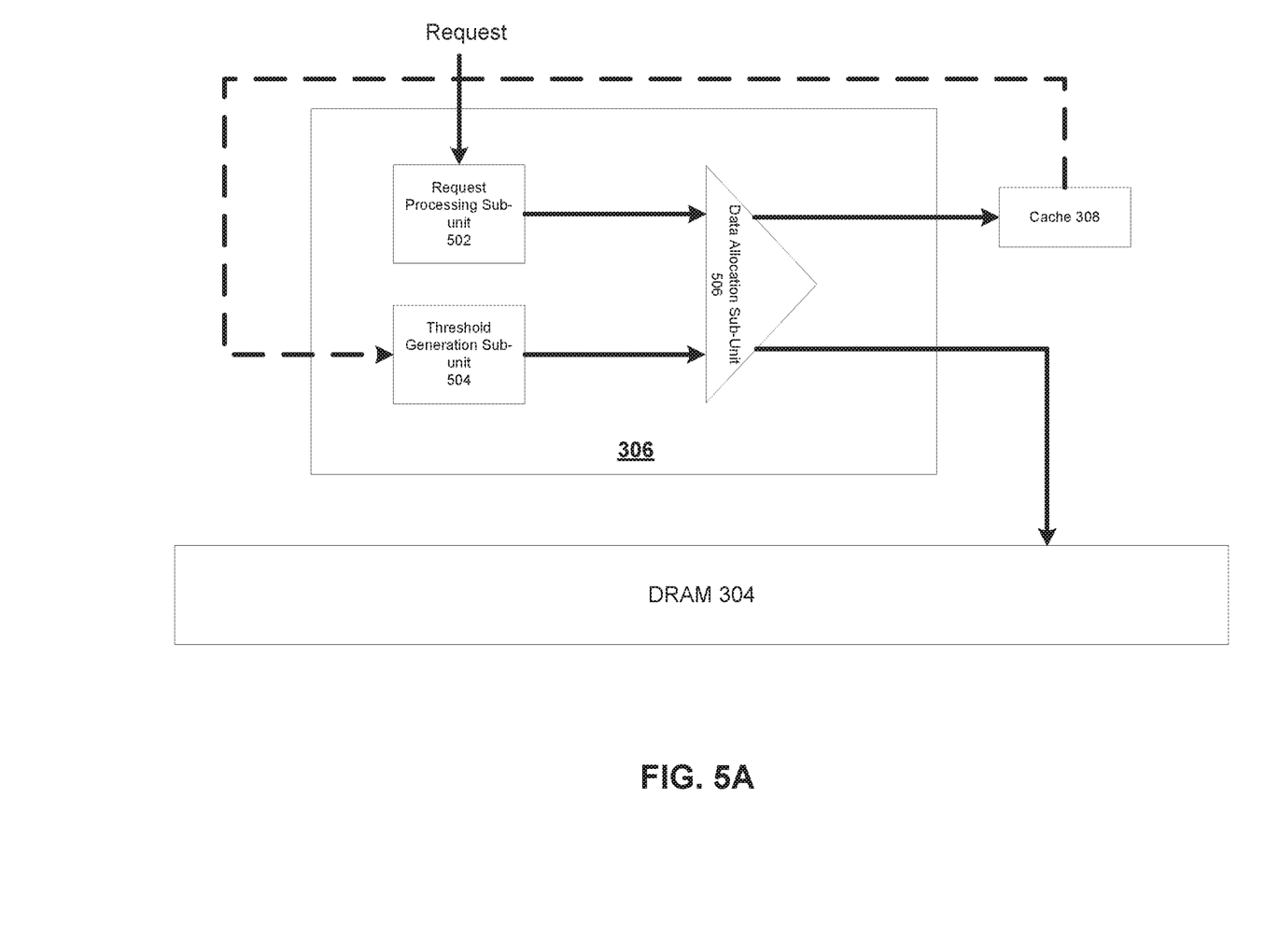
FIG. 5A illustrates a schematic diagram of an exemplary management unit, according to some embodiments of the disclosure.

FIG. 5A illustrates a schematic diagram of an exemplary management unit 306, according to some embodiments of the disclosure.

As shown in FIG. 5A, management unit 306 can include a request processing sub-unit 502, a threshold generation sub-unit 504, and a data allocation sub-unit 506. These sub-units can be further connected to other components of computing system 300 via an interface or a bus (e.g., bus 310). In some embodiments, management unit 306 can be implemented by e.g., application specific integrated circuit (ASIC) using hardware description language. In some embodiments, management unit 306 can be implemented by executing instructions on e.g., processing device 302.

In some embodiments, management unit 306 can receive instructions from processing device 302 for loading a graph (e.g., graph 100 of FIG. 1) into a memory space of computing system 300. The graph can include a plurality of nodes. Before being loaded, the graph can be stored in an external storage device (e.g., a hard disk). In some embodiments, the instructions can include a request for allocating a node to the memory space of computing system 300. The instructions can be generated by compiling a computing program related to graph processing.

Request processing sub-unit 502 can receive the request for allocating a node to the memory space. As discussed above, the memory space can include DRAM 304 and cache 308. The request can further include an address of the node in the external storage device. Based on the address of the node in the external storage device, the node can be retrieved and pre-processed.

In some embodiments, request processing sub-unit 502 can determine a node degree of the node. For example, request processing sub-unit 502 can traverse the graph (e.g., graph 100 or 210) to determine a node degree of a node. More particularly, request processing sub-unit 502 can traverse the structural data of a node to determine a number of one or more neighboring nodes associated with the node.

Referring back to FIG. 2B, by traversing graph 210, request processing sub-unit 502 can determine that, for example, node 2 has a pointer directed to three edges, and thus node 2 has three neighboring nodes. It is appreciated that the pointer of FIG. 2B may not be presented in a form of a "pointer." In some embodiments, when the graph (e.g., graph 210) is presented in a format of compressed sparse row (CSR), the pointer of FIG. 2B can be in a form of an offset in an array (e.g., array[ ]), indicating addresses of one or more neighboring nodes. For example, an offset P0 for node 0 can be "0," indicating an address of a neighboring node is stored in array[0]. In another example, an offset P2 and an offset P3 can be "3" and "6" indicating addresses of neighboring nodes are stored in an arrange of array[3]-array[6]. In other words, a number of neighboring nodes of node 2 can be a difference between offsets P3 and P2 (i.e., 6−3=3).

Accordingly, request processing sub-unit 502 can determine the number of one or more neighboring nodes associated with the node (e.g., node 2) as the node degree (e.g., 3).

Threshold generation sub-unit 504 can determine a condition for the allocation of the node. The condition can include a node degree being greater than a given threshold. In some embodiments, the threshold can be determined by an administrator of computing system 300. In some embodiments, the threshold can be determined by the instructions for loading the graph. In some embodiments, threshold generation sub-unit 504 can determine an available capacity of cache 308, and adjust the threshold based on the available capacity. For example, the threshold can be calculated based on the available capacity using a linear or non-liner function, or the threshold can be determined by adjusting a given threshold based on the available capacity. For example, cache 308 may only have an available capacity for storing three nodes and the graph (e.g., graph 210) includes five nodes, and thus, the threshold can be adjusted to reflect the limited available space in cache 308. It is appreciated that cache 308 can pass availability information to threshold generation sub-unit 504 via, e.g., bus 310.

Data allocation sub-unit 506 can allocate the node (e.g., node 2 of graph 210) to the memory space based on the request and the condition from request processing sub-unit 502 and threshold generation sub-unit 504. In some embodiments, data allocation sub-unit 506 can determine whether the node meets the given condition (e.g., the node degree being greater than the given threshold). When the node degree of the node meets the given condition, data allocation sub-unit 506 can allocate the node to cache 308.

In some embodiments, data allocation sub-unit 506 can allocate both the property data and the structural data of the node to cache 308, and therefore, the speed for accessing the node can be increased.

Figure 5B:
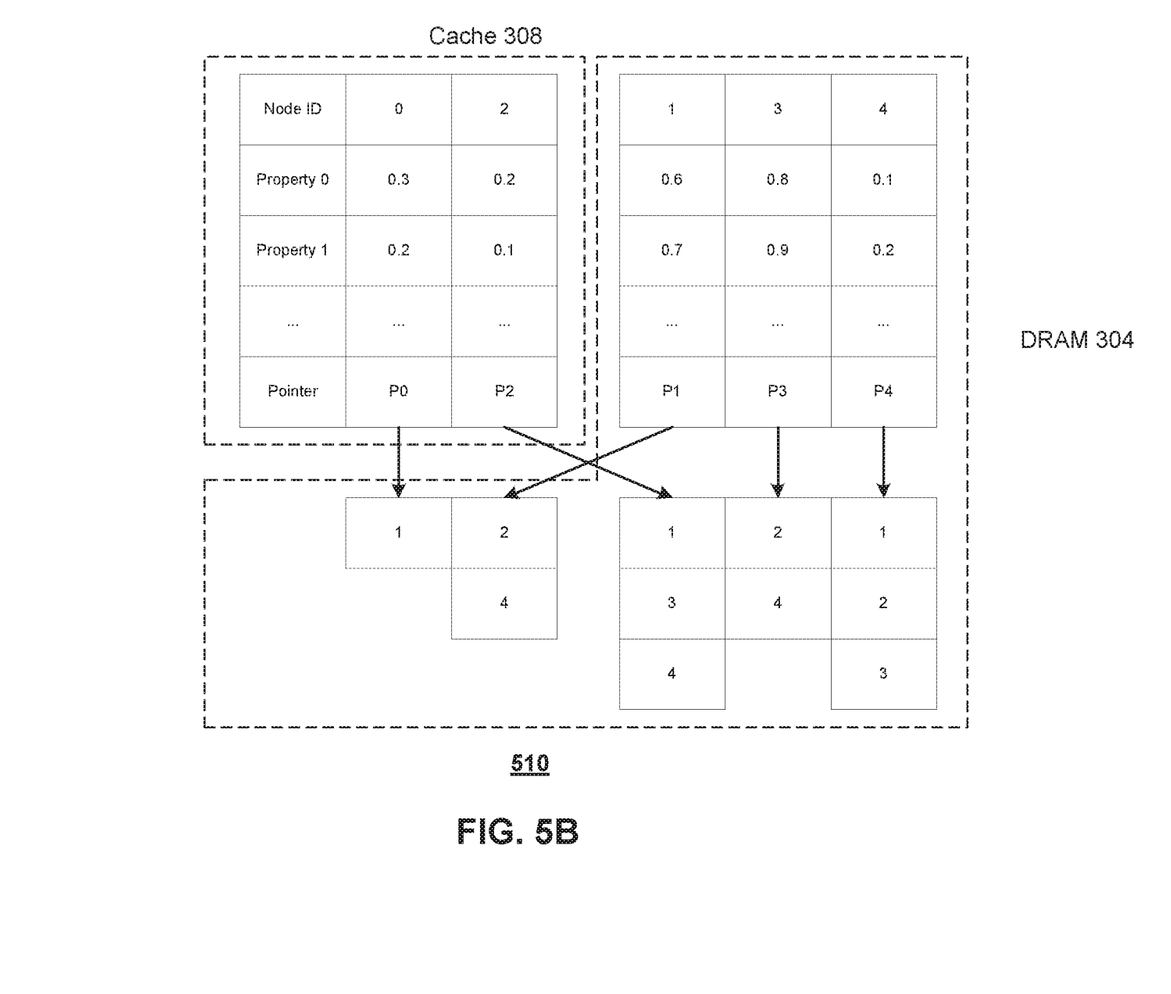
FIG. 5B illustrates an exemplary schematic diagram of node allocation, according to some embodiments of the disclosure.

However, by allocating both the property data and the structural data of the node to cache 308, the node data can occupy a considerable portion of the available space in cache 308. Thus, in some embodiments, data allocation sub-unit 506 can allocate the property data of the node to cache 308 and allocate the structural data of the node to DRAM 304. FIG. 5B illustrates an exemplary schematic diagram of node allocation 510, according to some embodiments of the disclosure. As shown in FIG. 5B, property data of a node 0 can be allocated to a buffer (e.g., cache 308) and structural data of node 0 can be allocated to an external memory (e.g., DRAM 304).

To respectively allocate the property and the structural data to cache 308 and DRAM 304, data allocation sub-unit 506 can also generate a mapping relationship between the property and the structural data of the node. In some embodiments, the mapping relationship can be stored as part of the property data of the node. Thus, the memory space of cache 308 can be efficiently utilized by allocating only the property data in cache 308.

When the node degree of the node fails to meet the given condition, data allocation sub-unit 506 can allocate the node to DRAM 304. When a node fails to meet the given condition, it can indicate that this node is not frequently accessed by e.g., the computing program. Thus, though the node is allocated to DRAM 304 with relatively slower speed, the overall performance of the computing system may not be significantly affected.

For example, referring to FIG. 5B, when the given condition is the node degree being greater than two, node 2 and node 4, whose node degrees are three, can meet the given condition. Thus, property data of node 2 and node 4 can be allocated to cache 308 to accelerate access speed of graph 210, and structure data of node 2 and node 4 can be allocated to DRAM 304 to save memory space of cache 308. Due to failing to meeting the given condition, nodes 0, 1, and 3, whose node degrees are one, two, and two, respective, can be allocated to DRAM 304.

As discussed above, the arrange of memory addresses for the memory space of computing system 300 can include a first set of addresses directed to DRAM 304 and a second set of addresses directed to cache 308. Therefore, after the node (e.g., node 2 of graph 210) is allocated to cache 308, the address for the node falls within the second set of addresses. It is appreciated that, in some embodiments, the structural data of the node can be separately allocated in DRAM 304, and the address for the structural data of the node falls within the first set of addresses, and can be determined based on the pointer of the node, which is associated with the address for the structural data in DRAM 304. Thus, though the structural data of the node may be allocated separately from the property data of the node, the structural data can be accessed based on the address of the node in cache 308.

Figure 6:
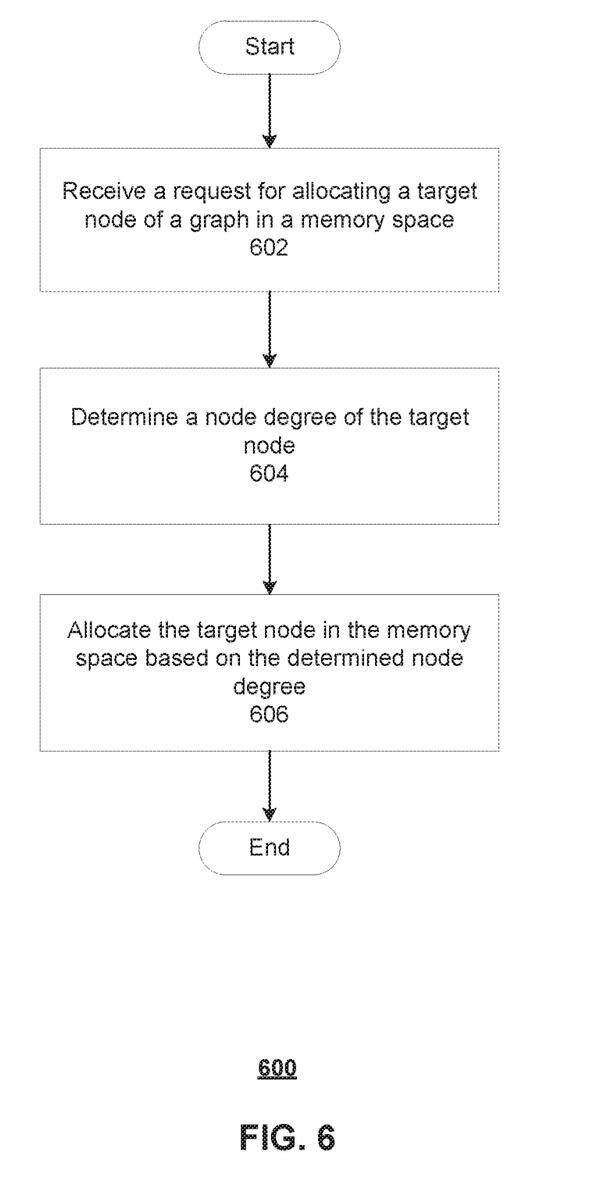
FIG. 6 illustrates a flowchart of a method for cache management in graph processing, according to some embodiments of the disclosure.

FIG. 6 illustrates a flowchart of a method 600 for cache management in graph processing, according to some embodiments of the disclosure. Method 600 can be executed by, for example, computing system 300 of FIG. 3. Method 600 can include steps as below.

At step 602, the computing system can receive a request for allocating target node data to a memory space. The memory space can include a buffer (e.g., cache 308 of FIG. 3) and an external memory (DRAM 304 of FIG. 3). The target node data can represent a target node of a graph (e.g., graph 100, 200, or 210 of FIGS. 1-2B) including a plurality of nodes and edges among the plurality of nodes. The target node data can include property data and structural data. The property data can further include, for example, at least one of an identification of the target node, a property of the target node, or a pointer to the structural data. The structural data can include edges of the target node.

In some embodiments, the computing system can receive instructions for graph processing. For example, the instructions can be generated by compiling a computing program, which is directed to determining relationships between nodes of the graph. The compiled instructions for graph processing can include a request for allocating the target node data to the memory space. It is appreciated that the target node represented by the target node data can be any one of the plurality of nodes in the graph.

At step 604, the computing system can determine a node degree associated with the target node data. The node degree associated with a node can be a number of edges connected to the node. In other words, the node degree is the number of neighboring nodes connected to the node. For example, in graph 100 of FIG. 1, a node degree of node 0 is 1 as only node 1 is connected to node 0, and a node degree of node 1 is 3 as nodes 0, 2, and 4 are connected to node 1.

To determine the node degree associated with the target node data, the computing system can traverse the structural data of the target node data to determine a number of one or more nodes connected to the target node via corresponding edges and determine the number of the one or more nodes as the node degree. In some embodiments, each node of the graph can include information of the node degree. For example, a given field of a node can be used to contain the information of the node degree, and computing system 300 can determine the node degree of the target node based on such information.

In some embodiments, the target node is in a format of compressed sparse row (CSR). In CSR, neighboring nodes of the target node can be determined based on an offset. Therefore, to determine the node degree of the target node, the computing system can determine the node degree of the target node based on a first offset and a second offset associated with the target node. For example, the first offset can be an offset indicating edges of the target node, and the second offset can be an offset indicating edges of a node that is stored next to the target node in CSR. Therefore, a difference between a first number of edges indicated by the first offset and a second number of edges indicated by the second offset can be the node degree of the target node.

At step 606, the computing system (e.g., data allocation sub-unit 506 of FIG. 5) can allocate the target node in the memory space based on the determined node degree. In some embodiments, the computing system can determine whether the node degree meets a given condition. In response to the determination of the node degree meeting the given condition, the computing system can partially allocate the target node data to the memory space. In some embodiments, the computing system can allocate the property data of the target node data to the buffer and allocate the structural data of the target node data to the external memory. The property data of the target node data allocated in the buffer can further include a mapping relationship for an address of the structural data in the external memory. For example, the pointer of the target node data allocated in the buffer can be associated with the address of the structural data in the external memory. It is appreciated that the computing system can also allocate both the property data and the structural data of the target node in the buffer.

In response to the determination of the node degree not meeting the given condition, the computing system (e.g., data allocation sub-unit 506 of FIG. 5) can allocate the target node data to the external memory.

The given condition can be determined by e.g., threshold generation sub-unit 504 of FIG. 5. In some embodiments, the given condition can include the node degree being greater than a given threshold. The given threshold can be pre-determined or calculated by the computing system. For example, the computing system (e.g., threshold generation sub-unit 504) can determine an available capacity of the buffer, and adjust the given condition based on the available capacity. Therefore, when the buffer has less space for nodes of a graph, the threshold can be increased. And only nodes with higher node degrees can be allocated to the buffer.

The flow charts and diagrams in the figures illustrate the architecture, functionality, and operation of possible implementations of devices, methods, and computing program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

The embodiments may further be described using the following clauses:

1. A method for memory management, comprising:
receiving a request for allocating target node data to a memory space, wherein the memory space includes a buffer and an external memory, and wherein the target node data comprises property data and structural data and represents a target node of a graph having a plurality of nodes and edges;
determining a node degree associated with the target node data;
allocating the target node data in the memory space based on the determined node degree.

2. The method according to clause 1, wherein allocating the target node data to the memory space based on the determined node degree further comprises:
determining whether the node degree meets a given condition; and
in response to the determination of the node degree meeting the given condition, partially allocating the target node data to the buffer.

3. The method according to clause 2, wherein partially allocating the target node data to the buffer further comprises:
allocating the property data to the buffer; and
allocating the structural data to the external memory.

4. The method according clause 3, wherein the property data of the target node comprises at least one of an identification of the target node, a property of the target node, or a pointer; and the structural data of the target node comprises edges of the target node.

5. The method according to clause 4, wherein the pointer of the target node allocated in the buffer is associated with an address of the structural data in the external memory.

6. The method according to any one of clauses 2-5, further comprising:
in response to the determination of the node degree not meeting the given condition, allocating the target node data to the external memory.

7. The method according to any one of clauses 2-6, further comprising:
determining an available capacity of the buffer; and
adjusting the given condition based on the available capacity.

8. The method according to clause 7, wherein the given condition comprises the node degree being greater than a given threshold.

9. The method according to any one of clauses 1-8, wherein determining the node degree associated with the target node data further comprises:
traversing the structural data of the target node data to determine a number of one or more nodes connected to the target node via corresponding edges; and
determining the number of one or more nodes connected to the target node as the node degree.

10. The method according to any one of clauses 1-9, wherein the target node data is in a format of compressed sparse row (CSR), and determining the node degree associated with the target node data further comprises:
determining the node degree of the target node based on a first offset and a second offset associated with the target node data.

11. A computing system, comprising:
an external memory storing a set of instructions; and
a processor comprising a buffer and comprising circuitry configured to execute the set of instructions to cause the computing system to perform:
receiving a request for allocating target node data to a memory space, wherein the memory space includes the buffer and the external memory and the target node data comprises property data and structural data and represents a target node of a graph having a plurality of nodes and edges;
determining a node degree associated with the target node data;
allocating the target node data in the memory space based on the determined node degree.

12. The computing system according to clause 11, wherein in allocating the target node data to the memory space based on the determined node degree, the one or more processors are configured to execute the set of instructions to further cause the computing system to perform:
determining whether the node degree meets a given condition; and
in response to the determination of the node degree meeting the given condition, partially allocating the target node data to the buffer.

13. The computing system according to clause 12, wherein in partially allocating the target node data to the buffer, the one or more processors are configured to execute the set of instructions to further cause the computing system to perform:
allocating the property data to the buffer; and
allocating the structural data to the external memory.

14. The computing system according clause 13, wherein the property data of the target node comprises at least one of an identification of the target node, a property of the target node, or a pointer; and
the structural data of the target node comprises edges of the target node.

15. The computing system according to clause 14, wherein the pointer of the target node allocated in the buffer is associated with an address of the structural data in the external memory.

16. The computing system according to any one of clauses 12-15, wherein the one or more processors are configured to execute the set of instructions to further cause the computing system to perform:
in response to the determination of the node degree not meeting the given condition, allocating the target node data to the external memory.

17. The computing system according to any one of clauses 12-16, wherein the one or more processors are configured to execute the set of instructions to further cause the computing system to perform:
determining an available capacity of the buffer; and
adjusting the given condition based on the available capacity.

18. The computing system according to clause 17, wherein the given condition comprises the node degree being greater than a given threshold.

19. The computing system according to any one of clauses 11-18, wherein in determining the node degree associated with the target node data, the one or more processors are configured to execute the set of instructions to further cause the computing system to perform:
traversing the structural data of the target node data to determine a number of one or more nodes connected to the target node via corresponding edges; and
determining the number of one or more nodes connected to the target node as the node degree.

20. The computing system according to any one of clauses 11-19, wherein the target node data is in a format of compressed sparse row (CSR), and in determining the node degree associated with the target node data, the one or more processors are configured to execute the set of instructions to further cause the computing system to perform:
determining the node degree of the target node based on a first offset and a second offset associated with the target node data.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

What is claimed is:

1. A method for memory management, comprising:
receiving a request for loading target node data stored in an external storage device to a memory space, wherein the memory space includes a buffer and an external random-access memory, and wherein the target node data comprises property data and structural data and represents a target node of a graph having a plurality of nodes and edges;
determining a node degree associated with the target node data;
determining where to load, in the memory space between the buffer and the external random-access memory, the target node data from the external storage device based on the determined node degree; and
allocating the target node data either to the buffer or to the external random-access memory based on the determination where to load the target node data, comprising:
allocating property data of the target node to the buffer while allocating structural data of the same target node to the external random-access memory,
wherein the property data of the target node allocated in the buffer comprises a pointer associated with an address of the structural data of the target node in the external random-access memory.

2. The method according to claim 1, wherein allocating the target node data either to the buffer or to the external random-access memory based on the determined node degree further comprises:
determining whether the node degree meets a given condition; and
in response to the determination of the node degree meeting the given condition, partially allocating the target node data to the buffer.

3. The method according to claim 1, wherein
the property data of the target node further comprises at least one of an identification of the target node or a property of the target node; and
the structural data of the target node comprises edges of the target node.

4. The method according to claim 2, further comprising:
in response to the determination of the node degree not meeting the given condition, allocating the target node data to the external random-access memory.

5. The method according to claim 2, further comprising:
determining an available capacity of the buffer; and
adjusting the given condition based on the available capacity.

6. The method according to claim 5, wherein the given condition comprises the node degree being greater than a given threshold.

7. The method according to claim 1, wherein determining the node degree associated with the target node data further comprises:
traversing the structural data of the target node data to determine a number of one or more nodes connected to the target node via corresponding edges; and
determining the number of one or more nodes connected to the target node as the node degree.

8. The method according to claim 1, wherein the target node data is in a format of compressed sparse row (CSR), and determining the node degree associated with the target node data further comprises:
determining the node degree of the target node based on a first offset and a second offset associated with the target node data.

9. A computing system, comprising:
an external random-access memory storing a set of instructions; and
a processor comprising a buffer and comprising circuitry configured to execute the set of instructions to cause the computing system to perform:
receiving a request for loading target node data stored in an external storage device to a memory space, wherein the memory space includes the buffer and the external random-access memory and the target node data comprises property data and structural data and represents a target node of a graph having a plurality of nodes and edges;
determining a node degree associated with the target node data;

determining where to load, in the memory space between the buffer and the external random-access memory, the target node data from the external storage device based on the determined node degree; and allocating the target node data either to the buffer or to the external random-access memory based on the determination where to load the target node data, comprising:

allocating property data of the target node to the buffer while allocating structural data of the same target node to the external random-access memory, wherein the property data of the target node allocated in the buffer comprises a pointer associated with an address of the structural data of the target node in the external random-access memory.

10. The computing system according to claim 9, wherein in allocating the target node data either to the buffer or to the external random-access memory based on the determined node degree, the one or more processors are configured to execute the set of instructions to further cause the computing system to perform:

determining whether the node degree meets a given condition; and in response to the determination of the node degree meeting the given condition, partially allocating the target node data to the buffer.

11. The computing system according to claim 9, wherein the property data of the target node further comprises at least one of an identification of the target node or a property of the target node; and the structural data of the target node comprises edges of the target node.

12. The computing system according to claim 10, wherein the one or more processors are configured to execute the set of instructions to further cause the computing system to perform:

in response to the determination of the node degree not meeting the given condition, allocating the target node data to the external random-access memory.

13. The computing system according to claim 10, wherein the one or more processors are configured to execute the set of instructions to further cause the computing system to perform:

determining an available capacity of the buffer; and adjusting the given condition based on the available capacity.

14. The computing system according to claim 13, wherein the given condition comprises the node degree being greater than a given threshold.

15. The computing system according to claim 9, wherein in determining the node degree associated with the target node data, the one or more processors are configured to execute the set of instructions to further cause the computing system to perform:

traversing the structural data of the target node data to determine a number of one or more nodes connected to the target node via corresponding edges; and determining the number of one or more nodes connected to the target node as the node degree.

16. The computing system according to claim 9, wherein the target node data is in a format of compressed sparse row (CSR), and in determining the node degree associated with the target node data, the one or more processors are configured to execute the set of instructions to further cause the computing system to perform:

determining the node degree of the target node based on a first offset and a second offset associated with the target node data.

* * * * *